No. 713,616. Patented Nov. 18, 1902.
W. J. DOBBIN.
GRAIN DRILL.
(Application filed Jan. 20, 1902.)
(No Model.) 2 Sheets—Sheet 1.
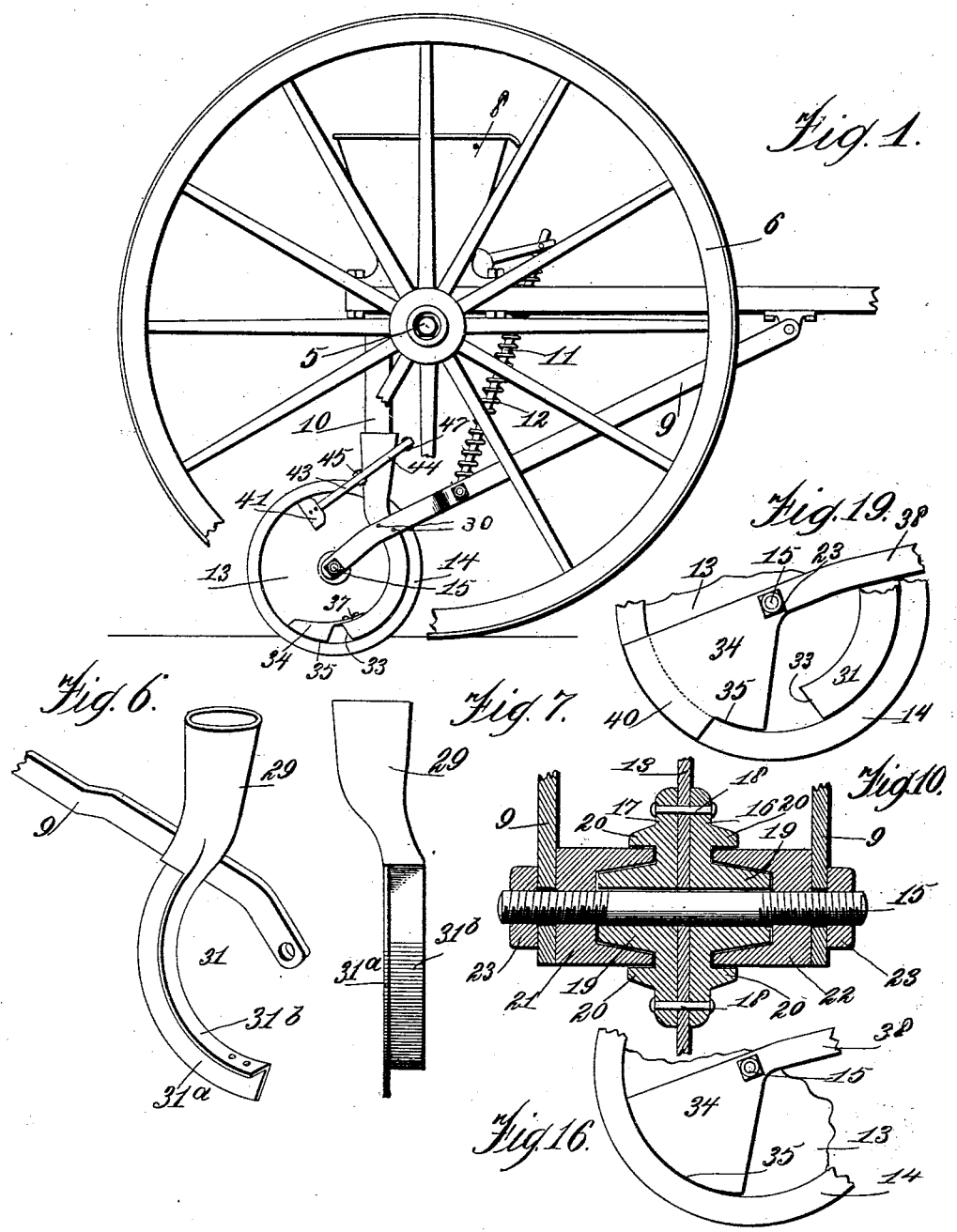
Witnesses: William James Dobbin, Inventor,
By Marion & Marion
Attorneys No. 713,616. Patented Nov. 18, 1902.
W. J. DOBBIN.
GRAIN DRILL.
(Application filed Jan. 20, 1902.)
(No Model.) 2 Sheets—Sheet 2.
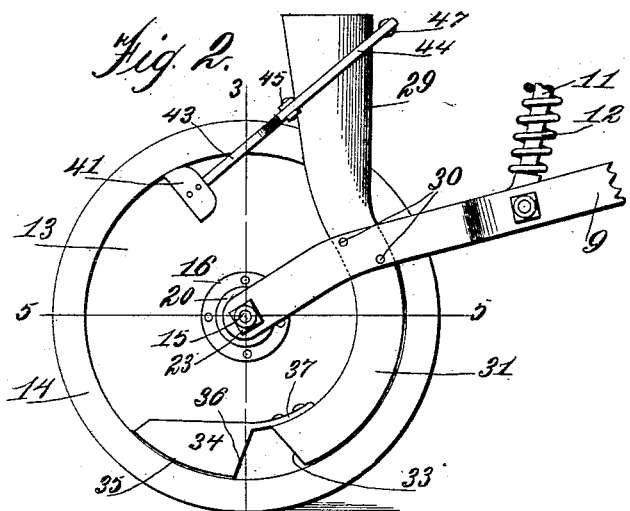
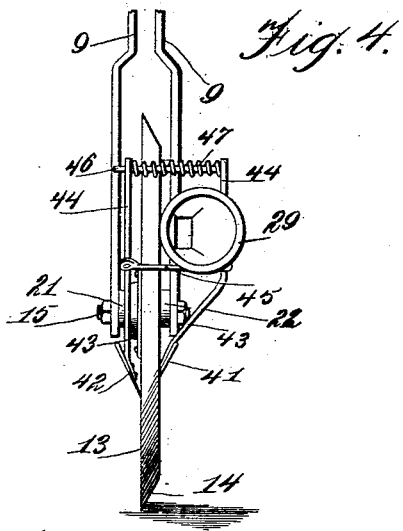
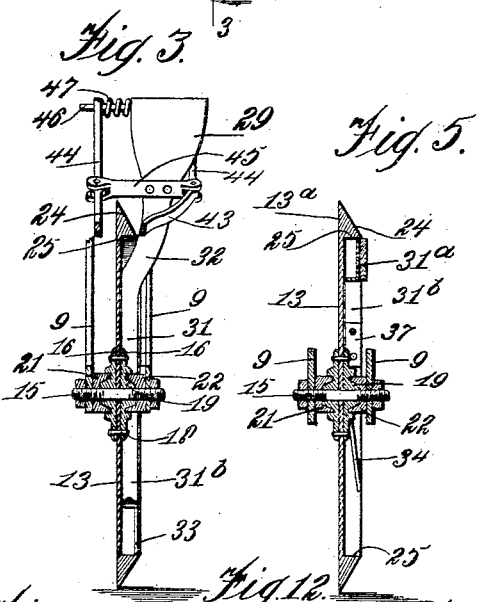
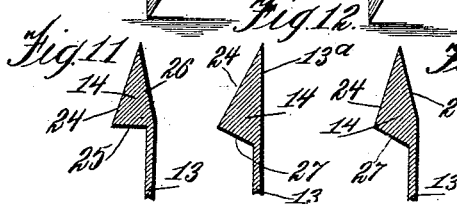
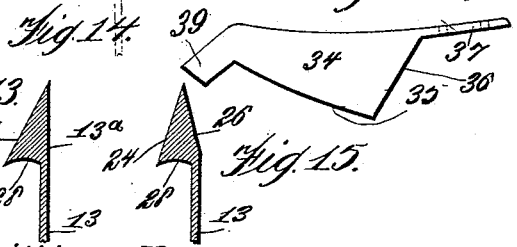
Witnesses:
William James Dobbin, Inventor,
By Marion & Marion
Attorneys

UNITED STATES PATENT OFFICE.

WILLIAM JAMES DOBBIN, OF MORRIS, CANADA, ASSIGNOR OF ONE-HALF TO JAMES M. HACKNEY, OF MORRIS, MANITOBA, CANADA.

GRAIN-DRILL.

SPECIFICATION forming part of Letters Patent No. 713,616, dated November 18, 1902.

Application filed January 20, 1902. Serial No. 90,432. (No model.)

*To all whom it may concern:*

Be it known that I, WILLIAM JAMES DOBBIN, a subject of the King of Great Britain, residing at Morris, county of Morris, Province of Manitoba, Canada, have invented certain new and useful Improvements in Grain-Drills; and I do hereby declare that the following is a full, clear, and exact description of the invention, such as will enable others skilled in the art to which it appertains to make and use the same.

My invention relates to improvements in grain-drills; and among other objects I have in view the following, which are mentioned as the most important, viz: to provide a single flat disk with a rim adapted to produce a deep and well-defined furrow in the soil, to provide an improved form of grain-tube which occupies a compact relation to a runway of the rimmed disk and is thereby adapted to discharge the seed-grain to said disk in a manner which insures its lodgment in the furrow below the surface of the soil, to provide means for positively discharging any grain which may have a tendency to lodge in the runway of the disk, and to provide means for scraping both faces of the disk from accumulations of soil.

With these ends in view the invention consists in the novel combination, construction, and arrangement of parts, which will be hereinafter fully described and claimed.

In the drawings hereto annexed, forming a part of this specification, Figure 1 is an end elevation of a part of a grain-drill having my improvements applied thereto. Fig. 2 is an enlarged side elevation showing the improved disk, the grain-tube, and the scraper. Fig. 3 is a vertical cross-section on the line 3 3 of Fig. 2. Fig. 4 is a top plan view of the parts shown by Fig. 2. Fig. 5 is a horizontal section on the line 5 5 of Fig. 2. Fig. 6 is a detail perspective view of the improved grain-tube. Fig. 7 is a view in edge elevation of the grain-tube shown by Fig. 6. Fig. 8 is a detail view showing the means for supporting and operating the scrapers adapted to keep the faces of the disk free from accumulations of soil. Fig. 9 is a supporting-bar for the scrapers of Fig. 8. Fig. 10 is an enlarged sectional view through the hub of the rotary disk. Figs. 11, 12, 13, 14, and 15 are cross-sectional views through different forms of the revoluble disk. Fig. 16 is a fragmentary detail view of the revoluble disk and of a drag-bar, showing one form of the grain-ejector or scraper. Fig. 17 is a side view of another form of the grain-ejector or scraper disconnected from the disk. Fig. 18 is a plan view of the part shown by Fig. 17. Fig. 19 is another fragmentary side view of a portion of the disk, a drag-bar, and the spout of the grain-tube, said view showing still another form of the grain-ejector or scraper.

The same numerals of reference denote like parts in all the figures of the drawings.

In Figs. 1, 5 designates the axle, on which is mounted the usual carrying-wheels, one of which is designated at 6. The frame supports the seedbox or hopper 8, and to this frame are connected the drag-bars 9. Depending from the rear portion of the frame is a series of flexible tubes or pieces of hose, (indicated at 10.) With each drag-bar 9 is associated a pressure-rod 11, which confines a spring 12, that exerts its energy upon the drag-bar and serves to normally depress the latter and to thereby force the disk into the ground. All these parts are or may be of the usual construction, and as no novelty therefor is claimed in this application I reserve the right to employ any preferred construction. One of the features of the present invention is a revoluble disk 13, the same being formed or provided with a rim 14 and the whole adapted to form a deep and sharply-defined furrow in the soil. I am aware that it is customary to employ a pair of reversely-inclined disks and to support said pair of disks on a single drag-bar; but I have simplified this construction by dispensing with one disk of the pair and by modifying the construction of the single disk which is retained, whereby each disk is mounted or journaled individually in its proper drag-bar. The disk consists of a flat circular plate of steel or other preferred material of the proper dimensions and proportions, and this disk is revolubly mounted in the downwardly-inclined rear ends of the members forming the drag-bar 9 through the medium of the bolt or axle 15. (See Fig. 10.) To the center of the disk and on opposite sides of the latter are applied the members 16 17, forming the disk-hub, and these two members are united solidly to the disk by the rivets 18. The members of the hub are formed with the oppositely-extending bearing-cones 19 and with the annular collars or flanges 20. The bearing-cups 21 22 are fitted against the inner sides of the members forming the drag-bar 9, said cups having conical openings arranged to receive the male bearing-cones 19 on the members of the hub. The bolt or axle 15 passes through the members of the drag-bar, the bearing-cups, the members of the hub, and the disk, and these parts are held in proper relation by the nuts 23. The end portions of the bearing-cups are housed within the annular collars 20, which are provided on the members of the hub, thus excluding sand from the bearing of the revoluble disk. I reserve the right to modify or change the construction of the means whereby the revoluble disk may be mounted in the drag-bar.

The rim 14 may be made an integral part of the revoluble disk, as shown by Figs. 3 and 5 and by Figs. 11 to 15, inclusive; but it will be evident to the skilled mechanic that this rim may be made in a separate piece of metal and united in any approved way to the disk. The rim may have a flat outer face 13$^a$ in the plane of one face of the disk; but the opposite face of the disk is necessarily inclined, as indicated at 24, such inclined face being joined to the opposite face of the disk by an annular face 25, which forms a circular runway for the grain on the inner face of the single disk 13. This annular face 25 is shown by Figs. 3, 5, and 11 as lying in a plane at right angles to the faces of the disk 13 and parallel to the axis thereof; but the cross-sectional contour of the rim may be modified, as shown by Figs. 11 to 15, inclusive. For example, the outer face 26 of the rim may be inclined or beveled, as shown by Fig. 11, while the faces 24 and 25 remain the same as in Figs. 3 and 5. The outer face 13$^a$ of the rim shown by Fig. 12 may lie in the plane of the outer face of the disk, while the inner face 24 of the rim may be inclined, as in Figs. 3, 5, and 11; but the annular face or shoulder of the rim may be inclined, as at 27, so as to meet the face 24 at an obtuse angle. In Fig. 13 I have illustrated the style of the rim which combines the inclined outer face 26 and the inclined inner face 24 of the rims shown by Fig. 11 with the inclined shoulder or annular face 27 shown by Fig. 12. In Fig. 14 the rim has the flat straight outer face 13$^a$, the beveled inner face 24, and the annular face or shoulder is made concave in cross-section, as at 28. In Fig. 15 I have shown the concave shoulder or face 28 of Fig. 14 combined in a rim which has the beveled outer face 26 and the beveled inner face 24.

29 designates a grain-tube which is circular at its upper portion and is adapted to receive the lower extremity of the flexible tube or piece of hose 10. This grain-tube may be supported in the machine by any suitable means; but, as shown by Figs. 1 and 2, the grain-tube is attached, as at 30, to a member of the drag-bar 9. A peculiarity of this grain-tube consists in the formation of a flat curved spout 31 at the lower portion thereof. (See Figs. 1, 2, 6, and 7.) The flattened spout 31 forms an integral part of the cross-sectionally circular grain-tube 29, although the spout may be made separate from the grain-tube and united in a suitable way therewith. The spout 31 is open on one side and at one edge, said spout being formed by a plate 31$^a$ and a flange 31$^b$, as shown more clearly by Figs. 6 and 7. Furthermore, the radius of the curved spout conforms to the rim 14 on the revoluble disk, and, as shown by Fig. 3, the flattened spout and the circular tube are joined by an inclined or offset shank 32. This construction enables the flattened and curved spout to be brought into substantially close relation laterally with respect to the disk 13 and with relation to the annular face or shoulder of the rim 14, whereby the disk is adapted to close the open side of the spout, and the shoulder of the rim performs a like office for the open edge of the spout, as shown more clearly by Figs. 3 and 5. From this description it is evident that the stationary grain-tube, which is mounted or supported on the drag-bar, is disposed in coöperative relation to the revoluble disk and its enlarged beveled rim, so that the annular face or shoulder of the beveled rim assists in the formation of a runway, into which the seed is discharged from the seedbox 8 by the flexible tube 10 and the grain-tube. The flattened and curved spout which extends downwardly from the stationary grain-tube terminates in a beveled lower edge 33, that is adapted to form a free and uninterrupted discharge-port through which the grain is free to escape.

Under some conditions of service of the grain-drill it is found that the seed-grain has a tendency to lodge against the annular face or shoulder of the rimmed disk; but I overcome this objection by the provision of an ejector or scraper, different forms of which are shown by Figs. 1, 2, 16, 17, 18, and 19. This scraper lies in rear of the discharge end of the flattened and curved spout 31, and it is disposed in close relation to the face of the disk and to the inner shoulder of the rim. This ejector 34 has a curved edge 35, that is disposed concentric with the shoulder of the rimmed disk, and, as shown by the drawings, the front edge 36 of the ejector is inclined, so that it may occupy a divergent relation to the end 33 of the curved spout, thereby providing ample space between the ejector and the spout for the escape of the seed. The ejector-plate may be supported in stationary relation to the revoluble disk by any suitable means. As shown by Fig. 2, the ejector-plate has an arm 37, which is fastened to the top edge of the flattened curved spout 31; but, if desired, this ejector-plate may be attached to an extension 38 of one member of the drag-bar, as shown by Figs. 16 and 19, or any other means may be resorted to for supporting the ejector-plate. As shown by the plan view Fig. 17, the ejector-plate lies at an angle to the shank 37 thereof, and it therefore follows that said ejector-plate does not lie in a parallel relation to the inner face of the revoluble disk; but, on the contrary, the ejector-plate lies at an angle or diagonally to the plane of the disk. This construction makes the inclined or diagonal ejector-plate extend across the annular face or shoulder of the rim on the disk, and the rear end of this ejector-plate thus terminates at or beyond the inner edge of the rim which is formed by the beveled face 24 and the annular face or shoulder. It follows from this construction and arrangement that the ejector-plate serves to positively scrape any seed which may lodge upon the shoulder or annular face of the rimmed disk, thereby discharging the grain with a "force-feed" action and insuring the proper deposit of the seed into the furrow and below the soil.

To more effectually discharge the grain from the rimmed disk and into the furrow, I may provide the ejector-plate with a downwardly-extending tailpiece 39, as shown by Fig. 17, said tailpiece adapted to scrape against the beveled edge or face 24 of the rim. Furthermore, instead of making the tailpiece narrow, as shown by Fig. 17, the ejector-plate 34, which is shown by Fig. 19, may have a wide flange or tailpiece 40, the same adapted to scrape against the beveled face of the revoluble disk.

Another improvement which I have made consists in the employment of scrapers 41 42, disposed in operative relation to the two faces of the revoluble disk. (See Figs. 1, 2, 4, and 8.) These scrapers are in the form of tapered blades or plates, which are secured to the inwardly-extending arms 43 of a pair of levers 44, the latter being fulcrumed to the end portions of a supporting-bar 45, that is secured to the grain-tube 29, although other means may be resorted to for the support of the scraper-carrying levers. The levers are arranged in inclined positions, as shown by Figs. 1 and 2, and each lever is fulcrumed at a point intermediate of its length by a suitable pin or bolt that is attached to one end of the supporting-bar 45. A guide-stem 46 is secured to one lever 44 and arranged to play in an opening of the other companion lever, (see Fig. 8,) and on this stem is loosely fitted a coiled pressure-spring 47, that acts against both of the levers and has a tendency to normally force the reversely-inclined scrapers 41 42 normally into engagement with both faces of the disk. As shown by Fig. 2, the scrapers engage with the upper portion of the disk and within the rim 14 thereof; but it is evident that the scrapers may be arranged in any desired way and adapted to engage with other portions of the disk for the purpose of keeping both faces thereof clean and free from accumulations of soil.

It is thought that the operation and advantages of my invention will be readily understood from the foregoing description taken in connection with the drawings.

Changes within the scope of the appended claims may be made in the form and proportion of some of the parts while their essential features are retained and the spirit of the invention is embodied. Hence I do not desire to be limited to the precise form of all the parts as shown, reserving the right to vary therefrom.

Having thus described my invention, what I claim as new is—

1. In a grain-drill, the combination of a revoluble disk provided with a beveled rim forming an annular face or shoulder and a grain-tube having its lower delivery end concentric with said rim, and disposed entirely within the thickness thereof to occupy a compact relation to the disk and its rim, substantially as described.

2. In a grain-drill, a revoluble disk provided with a beveled rim having an annular curved shoulder or face, and a grain-tube having its lower end curved and disposed concentric to and entirely within the thickness of said rim, substantially as described.

3. In a grain-drill, the combination of a revoluble disk provided with a rim, of a grain-tube which terminates in a flattened or curved spout, the same being disposed entirely within the thickness of said rim and having a coöperative relation to the disk and its rim, substantially as described.

4. In a grain-drill, a grain-tube having a flattened spout which is substantially L-shaped in cross-section being open on one side and at one edge, substantially as and for the purposes described.

5. In a grain-drill, a grain-tube having a flattened curved spout which is open at one side and on one edge, combined with a disk provided with a rim, said parts being disposed in mutual coöperative relation with the spout entirely within the thickness of the rim for the disk and its rim to close the open side and edge of the spout, substantially as described.

6. In a grain-drill, the combination with a disk and a grain-tube having its lower end curved concentric with and disposed within the thickness of the disk, of an ejector disposed within the thickness of the disk and having an operative relation to the disk and adjacent to the delivery end of the spout, substantially as described.

7. In a grain-drill, the combination with a disk and a grain-spout, of an ejector-plate disposed within the thickness of the disk and occupying a diagonal relation to a rim of the disk, substantially as described.

8. In a grain-drill, the combination of a disk provided with a rim, a grain-spout, having curved lower end within the thickness of the disk, and a relatively stationary ejector-plate disposed within the thickness of the disk in operative relation to the rim and having a tailpiece arranged to sweep the face of the rim, substantially as described.

9. In a grain-drill, the combination with a grain-tube and a revoluble disk, of a fixed lever-supporting bar, a pair of levers fulcrumed to the end portions of the bar, oppositely-inclined scrapers attached individually to the levers, a guide-stem attached to one lever and having slidable relation to the other lever, and a pressure-spring acting against both levers and tending to normally hold the scraper-blades in active engagement with the faces of the revoluble disk, substantially as described.

10. In a grain-drill, the combination with a rimmed disk, and a grain-tube having a flat curved spout disposed concentric to and entirely within the thickness of said disk, of an ejector-plate disposed within the thickness of said disk and having a curved edge disposed concentric with the shoulder thereof, the front of said ejector being inclined to occupy a divergent relation to the end of the curved spout, said ejector having a downwardly-extending tailpiece adapted to serve as a scraper against the beveled face of the rim of said disk.

In witness whereof I have hereunto set my hand in the presence of two witnesses.

WILLIAM JAMES DOBBIN.

Witnesses:
J. F. PRINGLE,
G. F. IRVING.